June 13, 1933.  M T. KNUTZEN ET AL  1,914,028
BRAKE MECHANISM
Filed Aug. 17, 1931   2 Sheets-Sheet 1
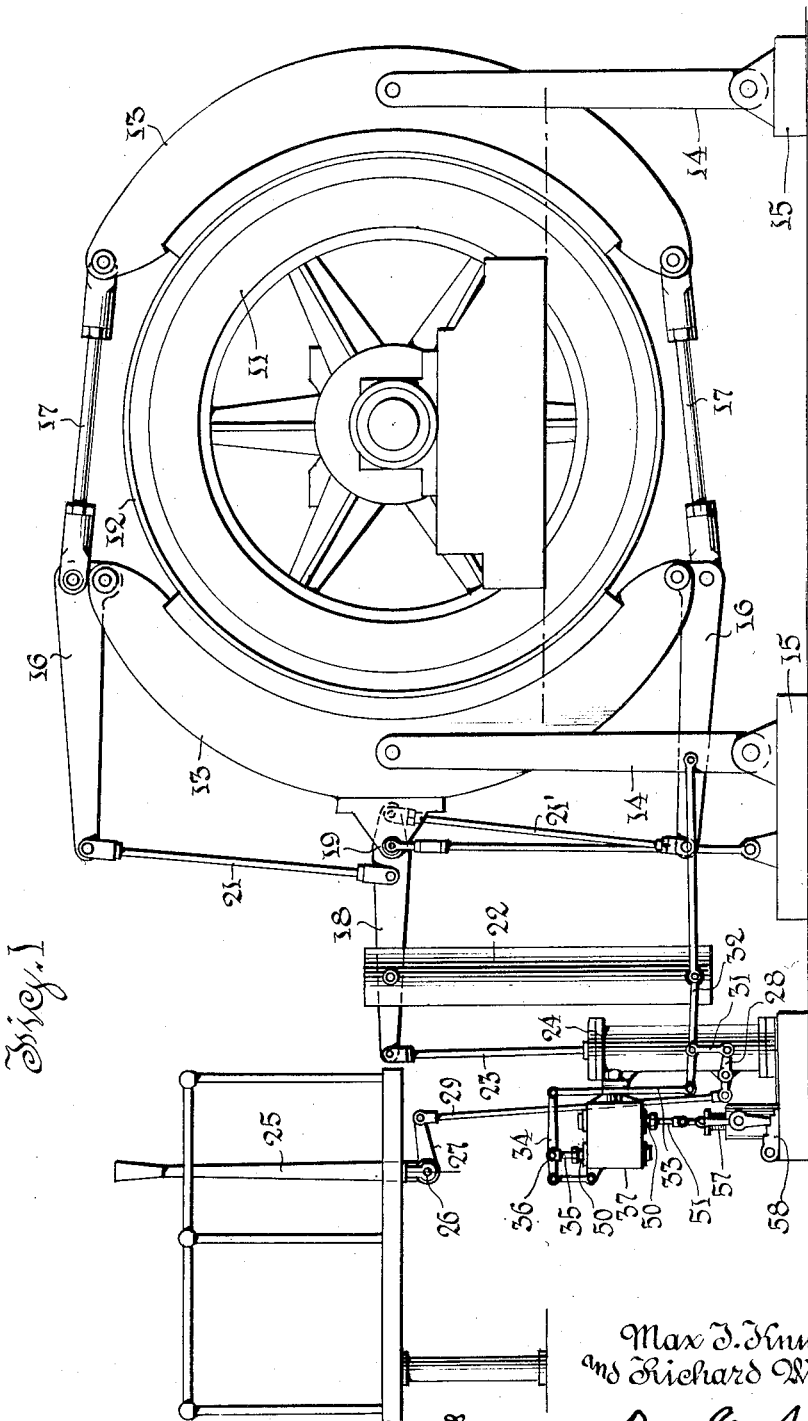
Inventors
Max T. Knutzen
and Richard Williams
By
Dodge and Sons
Attorney

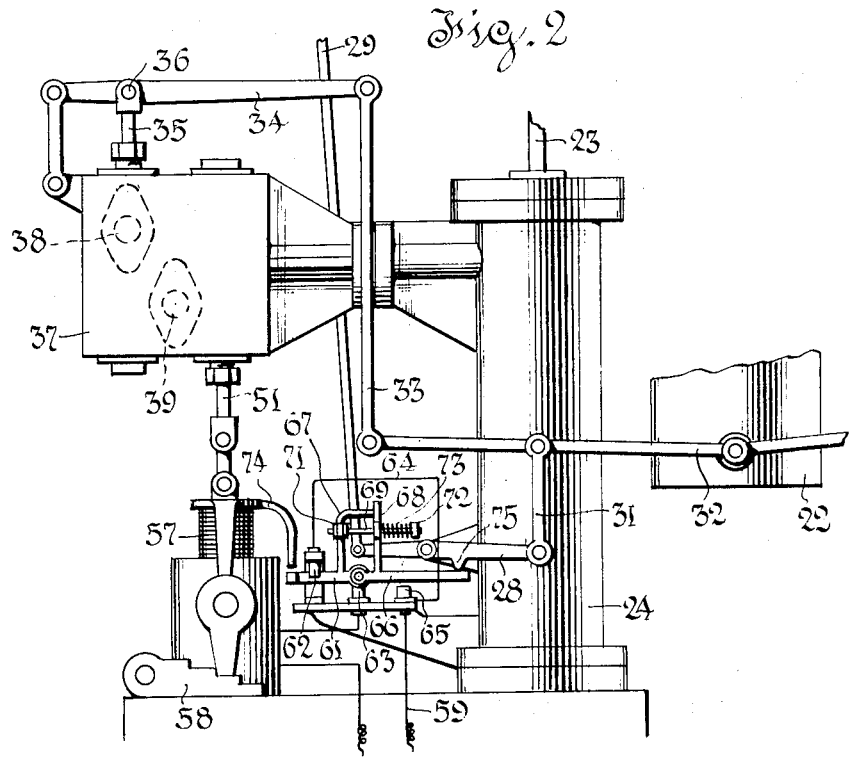
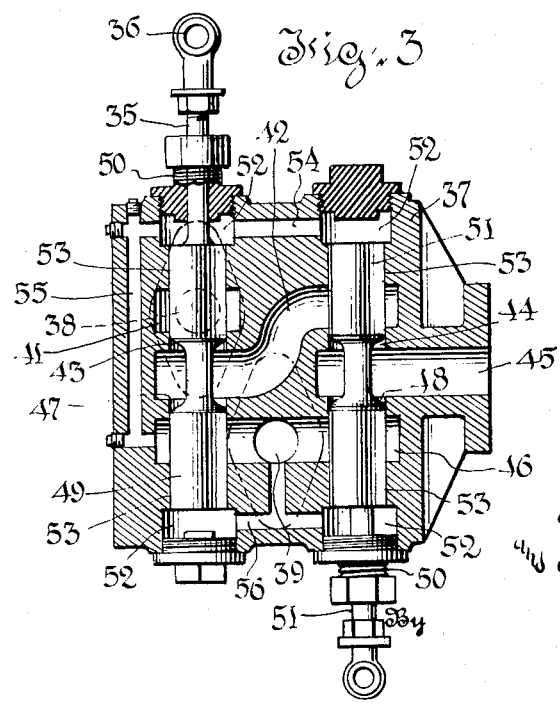

Patented June 13, 1933                                                                                               1,914,028

UNITED STATES PATENT OFFICE

MAX T. KNUTZEN AND RICHARD WILLIAMS, OF MILWAUKEE, WISCONSIN, ASSIGNORS TO NORDBERG MANUFACTURING COMPANY, OF MILWAUKEE, WISCONSIN, A CORPORATION OF WISCONSIN

BRAKE MECHANISM

Application filed August 17, 1931. Serial No. 557,672.

This invention pertains to power brakes for elevators, particularly to that type employed in connection with mine hoists, and has to do with automatic mechanism for applying the brakes under abnormal conditions.

In the applications of Morten Smith-Petersen, Serial No. 250,248, filed January 28, 1928 (since issued as Patent No. 1,818,007), and B. V. E. Nordberg, Serial No. 366,058, filed May 25, 1929 (since issued as Patent No. 1,841,449), there are described hoist brake mechanisms including a solenoid normally energized to permit actuation of a hydraulic motor for releasing the brakes and which, when deenergized, will cause the brakes to be applied. The applications also show a double valve for controlling the fluid supply to the hydraulic mechanism.

In the present invention it is proposed to combine with the solenoid a switch device adapted to interrupt the solenoid circuit upon deenergization of the solenoid and which can reestablish the connections to the power line only after the brakes have been fully applied by manual operation of the brake setting mechanism.

It is also proposed to simplify the valve descried in the Smith-Petersen and Nordberg applications referred to, a single valve being adapted to control the supply to or discharge from the fluid-actuated brake applying mechanism.

The invention will be understood from the following description thereof and the accompanying drawings, in which:—

Fig. 1 is a side elevation of the brake and applying mechanism, certain parts being omitted for the sake of clearness;

Fig. 2 is a side elevation of the solenoid circuit interrupter showing its relation to the power cylinder and fluid control valve; and Fig. 3 is a sectional elevation of a preferred form of the valve used in connection with the invention.

In the drawings, the drum 11, around which the hoist cable is wound in the usual manner, is provided with a peripheral braking surface 12. Brake shoes 13 are mounted for engagement with the braking surface of the drum to arrest rotation thereof. The brake shoes are supported by links 14 pivotally connected to base members 15.

Application and release of the brakes are effected by bell crank levers 16 and adjustable connecting links 17, it being evident that the brakes will be brought into engagement with the drum when the bell cranks are moved toward each other. A lever 18 is fulcrumed at 19 to one of the brake shoes and links 21, 21' connected to lever 18 on opposite sides of fulcrum 19, form connections between the bell crank levers and lever 18.

Pivotally supported on lever 18 is a weight 22. A piston rod 23 connected to a piston in cylinder 24 holds lever 18 and weight 22 in their elevated positions normally to release the brakes. The position of the weight and piston rod with respect to the fulcrum of lever 18 provide for great leverage and heavy braking pressure when the weight is permitted to descend.

Manual operation of the braking mechanism is effected by a lever 25 fulcrumed at 26 and having an arm 27 to which lever 28 is connected by link 29. The valve mechanism for controlling the flow of fluid to and from cylinder 24 is connected to lever 28 by means of link 31, floating lever 32, link 33, and lever 34, the latter having a pivotal connection with the valve stem 35 at 36.

Referring to Fig. 3, the valve mechanism is mounted in a housing 37 having an inlet port 38 and an outlet port 39. Port 38 is in communication with a source of fluid under pressure, preferably oil, while port 39 is connected to a sump from which the fluid is pumped to the source or accumulator. The housing is provided with a chamber 41 into which port 38 opens and which communicates with a channel 42 through passage 43. Channel 42 also communicates through passage 44 with a second channel 45 leading to cylinder 24.

Channels 42, 45 are adapted to communicate with chamber 46 opening to outlet 39 through passages 47, 48. It is to be noted that passages 44, 48 and 43, 47 are in alignment and that double head piston valves 49, 51 are adapted to control flow of fluid through these passages.

It is evident, for instance, that when valve 51 is elevated, fluid will pass from channel 42 to channel 45 through passage 44, but passage 48 is closed. When valve 51 is lowered, passage 44 is closed and passage 48 is opened to permit fluid to flow from the cylinder through channel 45 and chamber 46 to outlet 39. The operation of valve 49 is similar to that of valve 51.

The spaces 52 above and below the valves at the ends of the valve guides 53 communicate with channels 54, 55, 56, all leading to the outlet chamber 46, so that any fluid leaking past the valves will be returned to the sums. This arrangement imposes atmospheric pressure on each side of the stuffing boxes 50, preventing leakage through the gland thereof and keeping substantially all the oil within the valve housing.

Under normal conditions of operation, a solenoid or electromagnet 57 connected to valve 51 will be energized and hold the valve in its elevated position; that is, opening passage 44 and closing passage 48. If now lever 25 is swung clockwise, lever 28 will be rocked to raise links 32, 33 and lever 34. Valve 49 will then be elevated to permit fluid to flow from inlet 38 through passage 43, thence through channel 42, passage 44 and channel 45 to the hydraulic cylinder 24 to elevate weight 22 and release the brake.

Due to the arrangement of floating lever 32 and its connections to weight 22 and link 33, it is obvious that after lever 25 has been rocked to brake releasing position and held stationary, continued raising of the weight will lower link 33 and lever 34 to return valve 49 to lapped position. This operation follows for any position of the brake lever.

When lever 25 is moved counterclockwise, valve 49 will be lowered to open passage 47 and close passage 43. Fluid will then flow to outlet 39, the weight falling to apply the brakes. Continued lowering of weight 22 with link 31 being held stationary raises valve 49 to lapped position so that the brake remains in applied position.

As distinguished from the valve described in the Smith-Peterson and Nordberg applications referred to hereinbefore, it will be seen that the single valve 49 is adapted to release and apply the brakes, depending on the movement of control lever 25, and that a second valve is positioned to either permit flow into or from the cylinder, depending on the position of the solenoid. This arrangement eliminates the mechanical linkage and latch device shown in the applications. It is to be understood that deenergization of solenoid 57 applies the brake automatically by apparatus to be described hereinafter, the automatic actuation of the brake resulting from abnormal conditions such as line failure, short circuits, overspeed, or other conditions. Step block 58, controlled by cage position, is adapted to break the fall of solenoid 57 and regulate the degree of brake application in accordance with the position of the cage. This mechanism is well known in the art and will not be described in detail.

As a further measure of safety, there is provided a switch in the solenoid circuit to prevent elevation of valve 51 by the solenoid until after the manual control lever 25 has been moved to brake applying position. The solenoid circuit, indicated at 59, is normally closed by a switch arm 61 engaging contact 62, the circuit including standard 63, to which arm 61 is pivoted, arm 61, contact 62, wire 64 and contact 65.

Also pivotally mounted on standard 63 is a second arm 66 normally spaced from contact 65. Projections 67, 68 are secured or formed on arms 61, 66, respectively, projection 67 being bent to limit the movement of the arms with respect to each other in one direction, but arranged to permit free movement of the projections away from each other. A bolt 69 having an enlargement 71 on one end thereof and a nut 72 at its other end passes through the projections. Interposed between nut 72 and projection 68 is a spring 73 which normally tends to maintain arms 61, 66 in alignment.

When solenoid 57 drops upon deenergization of circuit 59, finger 74 on the core of the solenoid engages arm 61, moving the latter away from contact 62 thereby to break circuit 59 at that point. Spring 73 maintains the aligned relation of arms 61, 66 during this movement and moves arm 66 away from contact 65. It will thus be seen that even though circuit 59 be completed at other points, the interruption effected by the safety switch continues until the circuit is again established through contact 65, arm 66 and standard 63. This can be done only by application of the brakes through the manual control.

As shown in Fig. 2, lever 28 carries a lug 75 designed to engage arm 66 when lever 28 is depressed; that is, when lever 28 is moved counterclockwise to brake applying position. The solenoid circuit will then be completed through standard 63, arm 66 and contact 65, assuming, of course, that it is not interrupted by failure of the power line, breakage or other automatic switches. Thereupon the solenoid will be elevated to reestablish normal operation of the brake applying mechanism. It is, therefore, apparent that automatic application of the brakes cannot be followed by manual release of the brakes without first moving the manual control to brake applying position.

While the invention as described is directed to a preferred arrangement of elements, it is to be understood that limitations are not to be imposed thereon, but that the same may be modified within the terms of the appended claims.

What is claimed is:—

1. The combination with a rotary drum; braking means therefor; a manual control for said braking means; automatic means responsive to abnormal conditions for applying said braking means, said automatic means being normally in brake release position; and means effective to prevent return of the automatic means to normal position after response to abnormal conditions except when said manual control is in brake applying position.

2. The combination with a rotary drum; braking means therefor; a manual control for said braking means; electromagnetic means responsive to abnormal conditions for applying said braking means and preventing actuation of said manual control, said electromagnetic means being normally energized to permit actuation of said manual control; switch means for interrupting the circuit of the electromagnetic means after said electromagnetic means has responded to said abnormal conditions; and means actuated by movement of the manual control to brake applying position for closing said circuit.

3. The combination with a rotary drum; braking means therefor; a manual control for said braking means; automatic means normally in position to permit control of said braking means by the manual control, and responsive to abnormal conditions to occupy another position for applying the braking means and preventing control thereof by the manual control; and means actuated by the movement of said automatic means to brake applying position for preventing the return thereof to normal position except when said manual control is in brake applying position.

4. The combination with a rotary drum of braking means therefor; a manual control for said braking means; a solenoid normally in position to permit control of the braking means by said manual control, said solenoid being deenergized under abnormal conditions to prevent actuation of the manual control; a switch in said solenoid circuit and adapted to be opened upon movement of the solenoid under said abnormal conditions; and a second switch operable by said manual control for closing said circuit when said manual control is in brake applying position.

5. The combination with a rotary drum of braking means therefor; a fluid-operated motor for applying and releasing said braking means; a first valve for controlling flow of fluid to and from said motor; a second valve interposed between said first valve and the motor; means normally holding said second valve open to permit flow between said first valve and the motor; and means responsive to abnormal conditions for releasing said holding means to close said second valve.

6. The combination with a rotary drum of braking means therefore; a fluid-operated motor for applying and releasing said braking means; a first valve for controlling flow of fluid to and from said motor; a second valve interposed between said first valve and the motor and adapted to control flow of fluid to and from the motor; means normally holding said second valve in position to permit supply of fluid to the motor; and means responsive to abnormal conditions for releasing said holding means whereby said second valve is moved from fluid supply to fluid discharge position to apply the braking means.

7. The combination with a rotary drum of braking means therefor; a fluid-operated motor for applying and releasing said braking means; a first valve for controlling flow of fluid to and from said motor; a second valve interposed between said first valve and the motor and adapted to control flow of fluid to and from the motor; manually operated means for actuating said first valve; automatic means normally holding said second valve in position to permit supply of fluid to the motor; and means responsive to abnormal conditions for releasing said holding means whereby said second valve is moved from fluid supply to fluid discharge position to apply the breaking means.

8. The combination with a rotary drum of breaking means therefor; a fluid-operated motor for applying and releasing said braking means; a first valve for controlling flow of fluid to and from said motor; a second valve interposed between said first valve and the motor and adapted to control flow of fluid to and from the motor; manually operated means for actuating said first valve, and electromagnetic means normally energized to hold said second valve in position to permit flow of fluid between said first valve and the motor and deenergized under abnormal conditions to interrupt flow between the first valve and the motor said second valve being moved to position to discharge fluid from the motor under said abnormal conditions thereby to apply said braking means.

9. The combination with a rotary drum of braking means therefor; a fluid-operated motor for applying and releasing said braking means; a valve housing having an inlet port and an outlet port through which fluid is supplied to and discharged from the motor; a first valve adapted when in one position to establish communication between said inlet port and said motor to release the braking means, and in another position to establish communication between the motor and said outlet port to apply the braking means; a second valve adapted when in a first position to establish communication between the motor and said first valve, and in another position to establish communication between the motor and said outlet port; means for actuating said first valve; and automatic means normally holding said second valve in said first position but responsive to abnormal conditions to move the second valve to said other position to apply the braking means.

10. A valve of the class described comprising a housing having inlet and outlet ports and oppositely disposed passages connecting respectively with said inlet and outlet ports, said housing also having a channel between and communicating with said passages; valve members in said passages for controlling flow of fluid therethrough; and valve guides for said members, said housing having channels therein communicating with said guides and said outlet port for conducting fluid leakage to the outlet port.

11. A valve comprising a housing having an inlet port for fluid under pressure and an outlet port for discharging the fluid at relatively low pressure, said housing having a channel communicating with said inlet and outlet ports; a piston valve having an elongated enlarged portion at each end thereof, said valve being movable in one direction to connect said channel with the inlet port and in the opposite direction to connect the channel with the outlet port, said channel being disposed between said enlarged ends; and spaced guide means for said enlarged ends, there being channels in the housing at each end of the valve communicating with said outlet port for conducting fluid leakage from the valve guides to the outlet port.

12. Valve mechanism comprising a housing having an inlet port for fluid under pressure and an outlet port for discharging the fluid at relatively low pressure, said housing having a channel communicating with said inlet and outlet ports; a pair of piston valves in series for controlling the flow of fluid between said channel and said ports; guide means at each end of each of said pistons, said housing being provided with passages connecting said guides, said passages having communication with the outlet port whereby fluid leaking past the valves through said guides is conducted to said outlet port.

13. A valve of the class described comprising a housing having inlet and outlet ports and a communicating passage between said ports; and a packless balanced piston valve in said passage adapted alternately to open said ports, said housing having channels communicating with the ends of said piston valve and said outlet port.

14. A valve of the class described comprising a housing having inlet and outlet ports and a communicating passage between said ports, said housing having aligned valve guides adjacent the inlet and outlet ports; and a packless balanced piston valve constrained to move in said guides and adapted alternately to open said ports, said housing having channels communicating with the ends of said guides and said outlet port.

In testimony whereof we have signed our names to this specification.

MAX T. KNUTZEN.
RICHARD WILLIAMS.